United States Patent
Singhal et al.

(10) Patent No.: US 7,716,684 B2
(45) Date of Patent: May 11, 2010

(54) SOFTWARE CONFIGURATION METHODS AND COMMON PRESENTATION LAYER

(75) Inventors: Upanshu Singhal, Redmond, WA (US); Tom Frencel, Bolton (CA); Patrick M. Simonich, Kent, WA (US); Aditya Kapoor, Bellevue, WA (US); Rock Brown, Burlington (CA); Peter Armorer, Mississauga (CA)

(73) Assignee: EMC Corporation, Hopkinton, MA (US)

( * ) Notice: Subject to any disclaimer, the term of this patent is extended or adjusted under 35 U.S.C. 154(b) by 1260 days.

(21) Appl. No.: 10/997,580

(22) Filed: Nov. 24, 2004

(65) Prior Publication Data
US 2006/0112345 A1 May 25, 2006

(51) Int. Cl.
G06F 9/44 (2006.01)
G06F 9/45 (2006.01)

(52) U.S. Cl. .................... 719/328; 717/100
(58) Field of Classification Search ............ 719/328; 370/254
See application file for complete search history.

(56) References Cited

U.S. PATENT DOCUMENTS

| | | | |
|---|---|---|---|
| 5,680,551 A | 10/1997 | Martino, II | |
| 5,859,637 A | 1/1999 | Tidwell, II | |
| 5,966,532 A | 10/1999 | McDonald et al. | |
| 6,502,234 B1 | 12/2002 | Gauthier et al. | |
| 6,574,791 B1 | 6/2003 | Gauthier et al. | |
| 6,691,302 B1 | 2/2004 | Skrzynski et al. | |
| 6,728,751 B1 | 4/2004 | Cato et al. | |
| 6,757,698 B2 | 6/2004 | McBride et al. | |
| 6,941,520 B1 | 9/2005 | Lewallen | |
| 7,146,387 B1 | 12/2006 | Russo et al. | |
| 7,167,483 B1 * | 1/2007 | Sharma et al. | 370/442 |
| 7,293,237 B1 * | 11/2007 | Knight et al. | 715/735 |
| 7,370,335 B1 | 5/2008 | White et al. | |
| 2003/0084046 A1 * | 5/2003 | Rogers et al. | 707/10 |
| 2003/0101070 A1 * | 5/2003 | Mahosky et al. | 705/1 |
| 2003/0222920 A1 * | 12/2003 | Bybee et al. | 345/788 |
| 2004/0098141 A1 * | 5/2004 | Martin | 700/18 |
| 2004/0113940 A1 * | 6/2004 | Brockway et al. | 345/741 |
| 2004/0165544 A1 * | 8/2004 | Cornett et al. | 370/254 |

OTHER PUBLICATIONS

IBM, "Tivoli Storage Manager Using the Application Program Interface", Jul. 2000, IBM.
IBM, "IBM Tivoli Storage Manager for Windows, Quick Start", Apr. 2003, IBM.
U.S. Appl. No. 10/997,576, Mail Date Apr. 29, 2008, Office Action.
U.S. Appl. No. 10/997,576, Mail Date Dec. 18, 2008, Final Office Action.

* cited by examiner

Primary Examiner—Hyung S Sough
Assistant Examiner—Abdou K Seye
(74) Attorney, Agent, or Firm—Workman Nydegger (57) ABSTRACT

Methods and systems for backing up data of a client connected to a server. The methods and systems include operating a graphical user interface for displaying to a user information about the data of a client. At an administrator module and client module, initiating one or more wizard program modules including dynamic link libraries configured to carry a user through the steps to complete a backup function, each wizard program module having one or more application programming interfaces which allow the wizard program modules to communicate with the operating system on which the administrator module or client module is operating. A common presentation layer can also be included to provide one or more common user interface screens which are insertable into each wizard program module.

20 Claims, 4 Drawing Sheets

SOFTWARE CONFIGURATION METHODS AND COMMON PRESENTATION LAYER

BACKGROUND OF THE INVENTION

1. The Field of the Invention

The present invention relates to wizard applications. Specifically, the present invention relates to a modular architecture for wizard applications and also to wizard applications with a common look and feel regardless of the operating system platform on which the wizard applications are operating.

2. The Relevant Technology

Wizard utility applications have conventionally been used to allow a computer user (e.g., a client user, developer, technician, or programmer) to perform an operation on a computer by providing a series of steps and offering assisting in completing these series of steps. However, wizard applications are generally operating system platform specific. For example, a wizard application on a Windows NT operating system cannot be easily implemented on a Solaris operating system.

Furthermore, even if the user were to place the wizard application on a different operating system, the user is not ensured that all of the application programming interface (APIs) will be available to be able to communicate with the operating system platform.

In addition, when wizard applications are used on different operating systems, they can have a different look and feel which makes interacting with the wizard application difficult if a user is not familiar with the different looks and feels on various operating systems. In fact, even when a wizard application is designed for another platform, it typically does not provide the same look and feel as on other platforms.

There are many situations where this lack of a common look and feel can reduce the effectiveness of a wizard application. A software programmer, for example, may spend more time than is necessary when implementing wizards on different platforms. Further, the user does not always have time or the expertise to perform the extensive programming changes that would allow a wizard application to run more effectively on a different operating system.

BRIEF DESCRIPTION OF THE DRAWINGS

To further clarify the features and advantages of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

The present invention relates to systems and methods for configuring client resources for an operation such as backing up the client resources or restoring the client resources. Embodiments of the invention include a wizard configuration application with an architecture that facilitates operation of a wizard application for multiple users, such as, but not limited to, network administrators, software developers or programmers, technicians, customer services representatives, client users, and the like.

Embodiments of the invention are described in the context of a system that performs backup and restore operations for client data. One of skill in the art can appreciate, however, that embodiments of the invention are applicable to other base applications.

Embodiments of the invention are useful to demonstrate how a backup process can perform a backup of a particular application or file system. Also, embodiments of the invention can be used to configure client resources as well as provided a common look and feel across platforms.

1. Exemplary Operating Environment

Figure 1:
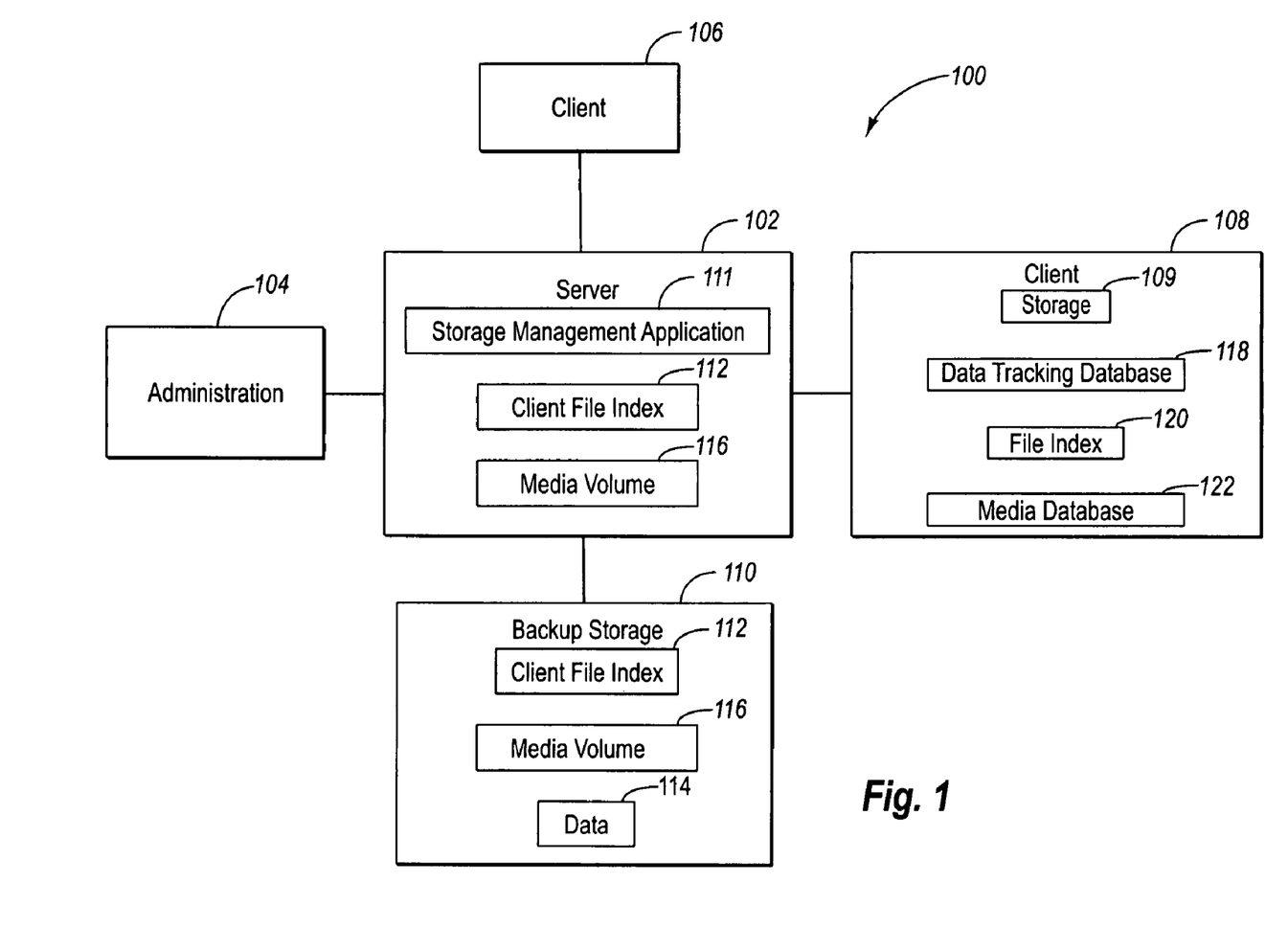
FIG. 1 illustrates an exemplary environment for implementing embodiments of the present invention.

FIG. 1 illustrates an exemplary system 100 for backing up data. A server 102 is connected to an administrator computer 104, which is used by a user to communicate with the server 102. Server 102 has a relationship with client(s) that are represented by the clients 106 and 108. Each client 106 and 108 may have data on a storage volume that is local with respect to the each client. The storage volume may include different volumes or drives for the client as well as represent applications and services. The client 108, for instance, has storage 109 that contains data (e.g., including applications, services, and/or volumes).

Thus, each client 106 and 108 represents a system with data to be backed up. Each client 106 and 108 can be relatively simple (e.g., a desktop computer) or relatively complex (e.g., a large database server or a cluster of servers). The client 106 or 108 may further be a network or a storage area network (SAN). Each client 106 and 108 may operate under a different operating system or platform than the server 102. The administrator computer 104 may also be a client.

In the context of a backup operation, a user may operate administrator computer 104 to control the server 102 in order to effectuate a backup operation on a client 106 or 108 or to schedule future backup processes for the clients 106 and 108. However, a user can also initiate a backup operation directly from server 102 or client 106 or 108. A user may establish a schedule that defines the times at which the server 102 automatically performs a backup operation on the data of clients 106 or 108.

Once initiated by the server 102, a backup process typically operating on a client controls and directs all server initiated backup operations or recovery operations. The client 106 or 108 may also initiate ad hoc backup operations. Data is backed up, in one embodiment, using backup groupings. Each backup grouping is a collection of data or items that are backed up during a backup operation between the server 102 and a particular client 106 and/or 108. A backup grouping can therefore include a group of files, an entire file system, application-generated data, such as a database or operating system information, and the like. A backup grouping may also include applications or services and their associated writers.

In the example of FIG. 1, the server 102 has access to backup storage 110. The backup storage 110 can be integrated with the server 102 or may be distinct and separate from the server 102. The data 114 represents the data on client 106 or 108 that has been backed up by the server 102 on the backup storage 110. Backup storage 110 can be implemented in relation to server 102 in various ways, for example, as direct attached storage (DAS), network attached storage (NAS), or storage area network (SAN).

The server 102 also stores and manages a client file index 112 and a media volume 116 both on the server itself and on the backup storage 110. The client-file index 112 is an index of the backed up data items. The media volume 116 is an index of volumes. The client file index 112 and the media volume 116 are collectively referred to herein as the "online indexes". The online indexes are typically stored on the backup storage 110 after the backup operation is complete.

Server 102 includes a storage management application 111 directing high-performance writes to various storage devices, e.g., backup storage 110, whether local or remote. In the event that the site experiences a disaster, server 102 can recreate all the client 106 or 108 and/or server 102 file systems to their original structure, as they existed when written to storage. A user operates one or more wizard applications (described below) to run or configure the backup or storage management application 111. The wizard application assists the user in performing the steps necessary to carry out the backup of one or more client file systems or other types of data.

Figure 2:
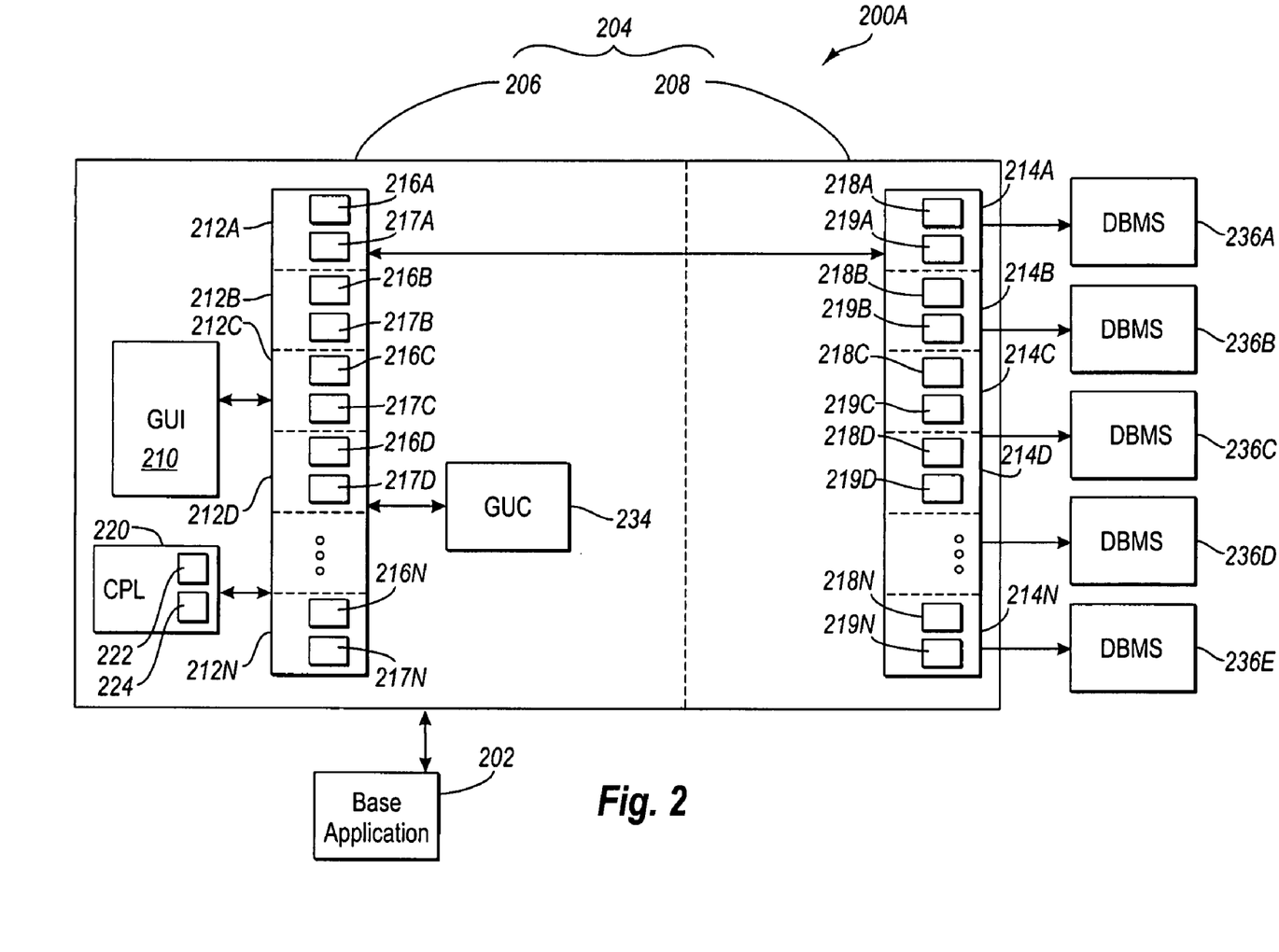
FIG. 2 illustrates one exemplary application for implementing embodiments of the present invention.

FIG. 2 illustrates an exemplary software application 200A that includes a backup application 202, for example, which uses a wizard configuration application 204 for assisting a user in running one or more wizard applications with the backup application 202. Wizard configuration application 204 can exemplarily include an administrator module 206 and one or more client modules 208.

Administrator module 206 is typically located on user machine or administrator computer 104. Client module 208 is typically operating on a client 106. However, FIG. 2 illustrates that administrator module 206 and client module 208 can be located on the same device, for example, a network server 102. In another embodiment, shown in FIG. 3, administrator module 206 and client module 208 can be located on different devices and directly or indirectly through a network configuration. In addition, wizard configuration application 204 can communicate directly or indirectly with backup application 202, which is typically located on a network server such as server 102 illustrated in FIG. 1. As such, it will be appreciated that backup application 202, administrator module 206, and/or client module 208 could be located on the same computer. In other embodiments, backup application 202, administrator module 206, and client module 208 can each be located on a separate machine or computer in such a way that they are able to communicate and/or transfer data.

For purposes of description, client 106 will be used as an exemplary client being configured for data backup, even though it is understood that both clients 106 and 108 could be running client module 208 and be configured for backup.

Backup application 202 provides the coordination for back-up, write, recovery, data life-cycle, and volume management operations of the file system data of various clients 106 or 108. The wizard configuration application 204 overlaps or sits on top of the backup application 202 and controls communication between the client module 208 and the backup application 202. The wizard configuration application 204 also provides the user interface through which users can operate one or more wizard applications which drives the functionality of the backup application 202. Thus, backup application 202 and wizard configuration application 204 may use some of the same information retrieved from client module 208 in order to carry out their tasks.

More details regarding aspects of backup application 202 can be found at co-pending U.S. patent application Ser. Nos. 10/935,552, filed Sep. 7, 2004, and 10/935,551, filed Sep. 7, 2004, which are incorporated herein by reference.

2. Wizard Configuration Application

As discussed above, FIG. 2 illustrates a system 200A having a wizard configuration application 204 that includes an administrator module 206 and a client module 208. In one embodiment, the administrator module 206 is a collection of processes and programs installed on administrator computer 104 that provides a user with administrative capabilities to be able to interface with backup application 202 and client module 208. Exemplarily, this is accomplished by providing a graphical user interface and one or more wizard applications, described in more detail below. Thus, although backup application 202 is configured to execute many functions independently, administrator module 206 has the ability to control and influence the functionality of the backup application 202. In one embodiment, the wizard configuration application 204 configures the client for backup and restore processes. Advantageously, the wizard configuration application 204 provides a common look and feel across operating systems and also provides a library of user interfaces.

In one embodiment, the client module 208 is a collection of processes and programs installed on client 106. Client 106 contains data to be backed-up, or, more basically, can be any machine in the server environment with data to be backed-up. Backing up the client module 208 includes the use of backup groupings. Each backup grouping identifies, for example, an application, set of application, or a file system to be backed up. In some instances, each application included in the backup groupings should be backed up together to preserve a state of the client.

For purposes of explanation, the wizard configuration application 204 can have a bifurcated configuration in which some modules or components reside on the administrator module 206 (referred to as "administrator-side") and other modules reside on the client module 208 (referred to as "client-side"), the administrator-side modules and components and client-side modules and components interacting to produce the particular functionality of the wizard applications of the present invention. However, as illustrated in FIG. 2, all the modules necessary to implement a wizard application can reside on a single computer, for example, in a client-user situation.

In greater detail, as shown in FIG. 2, administrator module 206 includes a graphical user interface (GUI) 210. The GUI 210 is an executable application that serves as an interface for displaying user interface screens for allowing the user to configure, select and/or operate one or more wizard applications (discussed below). When administrator module 206 is initiated, GUI 210 forms a connection between backup application 202 and administrator module 206. GUI 210 also establishes a connection between administrator module 206 and client module 208. The connection between administrator module 206 and client module 208 establishes communication between the administrator module 206 and client module 208 so that the GUI 210 makes available information about client 106 to the user at administrator module 206.

The GUI 210 can allow a user to select a server 102, wizard application type, and one or more clients 106. The user can then select through GUI 210 the particular function desired to be performed on each client 106. It will be appreciated that depending on the content of the client 106, the potential functions that are actually performed on each client may vary from client to client. Thus, operation of the GUI 210 initiates and drives the other functions of wizard configuration application 204.

The GUI 210 interacts with and allows a user to operate one or more wizard applications which are configured to perform particular functions. Examples of types of wizard applications include server configuration wizard applications, client configuration wizard applications, database configuration wizard applications, and file system configuration wizard applications. A server configuration wizard allows a user to select one or more servers. A client configuration wizard allows a user to select one or more clients to be backed up. After a user has selected one or more clients, a database configuration wizard may be used to allow the user to select database data to be backed up. Alternatively, the file system configuration wizard allows a user to select certain file system data to be backed up. In any case, the wizard applications generally provide user interface screens that carry the user through the various steps required to perform the desired operation. Each wizard application type can be accessed through the GUI 210.

As shown in FIG. 2, a plurality of administrator-side wizard program modules 212A through 212N resides on administrator module 206. Corresponding client-side wizard program modules 214A through 214N reside on client module 208. Exemplarily, administrator-side wizard program module 212A and client-side wizard program module 214A cooperate to form a wizard application. Each administrator-side wizard program module 212A through 212N includes a dynamic link library (DLL) 216A through 216N, respectively. Similarly, client-side wizard program modules 214A through 214N include DLLs 218A through 218N, respectively. DLLs 216A through 216N and DLLs 218A through 218N generally load user interface screens onto the GUI 210 and provide the functionality to perform the particular function for that wizard application depending on the information the user inputs into the user interface screens.

Exemplarily, wizard program modules 212A and 214A correspond to a server configuration wizard application, wizard program modules 212B and 214B correspond to a client configuration wizard application, wizard program modules 212C and 214C correspond to a database configuration wizard application, and wizard program modules 212D and 214D correspond to a file system configuration wizard application. That is, the wizard program modules 212A and 214A are configured to detect the server configuration. Wizard program modules 212B and 214B are configured to detect the client configuration. Wizard program modules 212C and 214C are configured to backup database data such as, but not limited to, Oracle Database server, SAP Database data, Microsoft Exchange server data, or Microsoft SQL server data. Finally, wizard program modules 212D and 214D are configured to backup file system data. It will be appreciated that more than one of each type of wizard applications can exist on wizard configuration application 204. For example, where it is desired to enable wizard configuration application 204 with the ability to backup more than one type of database data (e.g., Oracle Database server, SAP, Microsoft Exchange Server, and Microsoft SQL Server), a wizard program module 212 and 214 will be configured particular to each type of database data. Furthermore, it will be appreciated that not all types of these wizard applications need exist in a particular embodiment of wizard configuration application 204. Further, additional wizard applications configured to perform different functions may also exist on wizard configuration application.

As shown in FIG. 2, the wizard configuration application 204 includes a modular architecture for implementing wizard applications formed by administrator-side and client-side wizard program modules 212 and 214. The modular nature of wizard configuration application 204 allows new wizard applications to be written for the particular type of data for which they are being used and then loaded onto administrator module 206 and/or client module 208. It will be appreciated that additional DLLs can be programmed and added as needed to supplement administrator module 206 to accommodate backup of different types of data and to accommodate client configuration. For example, administrator-side wizard program module 212N and client-side wizard program module 214N represents a wizard application that can be separately programmed and configured and then installed on administrator module 206 and client module 208. DLLs 216N and 218N thus represent that DLL modules can be created for different client configurations, server configurations, file system configurations, and database configurations. The modular architecture of wizard configuration application 204 provides that programmers can thus upgrade the abilities of wizard configuration application 204 as needed. For example, a wizard application may exist to configure any type of device which may be associated with system 100 including, but not limited to, servers 102, administrator computers 104, clients 106, storage devices 109, backup storage 110, and the like, whether directly or remotely connected.

Administrator-side DLLs 216A through 216N and client-side DLLs 218A through 218N are each a library of functions or data that can be accessed by backup application 202 and/or wizard configuration application 204 in order to carry out the backup and/or recovery of the particular data. Administrator-side DLLs 216A through 216N and client-side DLLs 218A through 218N are accessed as needed depending on the particular backup being performed and the particular operating system on which the administrator module 206 and client module 208 may be operating. Further, each of administrator-side DLLs 216A through 216N and client-side DLLs 218A through 218N can be used by several programs at the same time.

When a user accesses GUI 210 and requests backup of a particular data type, the administrator-side DLLs 216A through 216N serves as a main driver for servicing the request from the user. That is, the administrator-side DLLs 216A through 216N sequence and load user interface screens that allow the user to select the required configuration information. Configuration information defines the parameters of the particular backup function that the backup application will perform. As such, the configuration information may change for each client. In addition, it is possible for a number of different backup functions to take place on a particular client so that configuration information must be specified for each process. The user generally uses GUI 210 to define configuration information for each backup operation. GUI 210 can create records that specify instructions to a high level of detail. Alternatively, the user can rely on pre-configured records to run the wizard applications.

Examples of the configuration information that GUI 210 can define include, but are not limited to, the storage devices 110 that server 102 will use, the number of clients 106, and the number of client connections that the server 102 can accept. In addition, the configuration information may also specify rules that the backup application 202 will enforce for a particular back-up and/or recovery function. Examples of these enforced rules include back-up schedules, the amount of time data is protected before being automatically recycled by the application, and which clients are able to recover data directly.

In terms of pools of volumes, configuration information also includes directing data to specific pools. GUI 210 can be used to segregate files into specific pools of volumes according to different file characteristics. The user can also use GUI 210 to define criteria to specify which backup groupings of data can be written onto a pool's volumes.

In addition, the user can use GUI 210 to define levels of obsolescence. Backup application 202 will monitor the status of stored data and automatically rotate it through the tracking system as it reaches levels of obsolescence defined by the user. The user can also select backup groupings for participation in a scheduled back-up. A backup grouping could include one or more files, directories, files systems, applications, and/or services, or all the files on a client machine.

Defining configuration information generally requires that administrator-side DLLs 216A through 216N and client-side DLLs 218A through 218N transmit data back and forth in order to allow the user to select the data to be backed up. In one embodiment, the administrator-side DLLs 216 can perform a request function while the client-side DLLs 218 perform a retrieve function. Requesting can include selecting the data to be backed up by defining backup groupings or client resources and retrieving can include detecting the data on the client 106.

In addition to the modular architecture of wizard configuration application 204, application 204 simultaneously ensures that the wizard applications will operate even when the administrator module 206 and client module 208 are operating on different platforms. The GUI 210 of administrator module 206 can interface with other operating system platforms on which client module 208 may be operating, allowing administrator module 206 to interface with and broker services for any client module 208. For example, administrator module 206 could be operating on Windows operating system while the client module 208 could be operating on a Linux operating system. Conventional wizard applications do not efficiently handle incompatibilities between operating systems and thus would make communication between the administrator module 206 and client module 208 difficult. However, the present invention provides that communication between administrator module 206 and client module 208 is possible and unaffected by differences in platforms. This may be especially advantageous where administrator modules 206 and client module 208 are located on different computers (see FIG. 3).

The administrator module 206 provides communication between different operating systems on administrator computers 104, clients 106 and server 102 by having the DLLs 216A through 216N include operating-system-specific application programming interfaces (APIs) 217A through 217N that allow the administrator-side wizard program modules 212A through 212N to communicate with the operating system on which the administrator module 206 is operating. The APIs 217A through 217N can be gathered from code network libraries for specific operating systems. Examples of APIs include Oracle Call Interface (OCI), SQLDMO, etc. Similarly, the client-side DLLs 218A through 218N provide particular APIs 219A through 219N that allow the client-side wizard program modules 214A through 214N to communicate with the operating system of the client module 208.

One aspect of the present invention is to provide a common look and feel among the various wizard applications that the user may use. In one embodiment, wizard configuration application 204 includes a common presentation layer (CPL) 220. Administrator-side DLLs 216A through 216N have a static link to CPL 220. CPL 220A is responsible for providing the common look and feel to the wizard applications created and/or operated on the wizard configuration application 204. CPL 220 includes a library of dialogue boxes or common user interface screens 222 applicable to all wizard applications. The administrator-side DLLs 216A through 216N access CPL 220 to retrieve these common user interface screens 222 and loads them onto GUI 210. Examples of common user interface screens include, but are not limited to, server selection, client selection, group selection, summary, results, and the like. Preferably, the common user interface screens 222 are self contained so that they can be independently inserted into various wizard applications and these screens can also be inserted in to any other window application, e.g. a single or multi document window application can also use CPL screens as a dialog boxes.

The CPL 220 also includes application programming interfaces (APIs) 224 to insert the common user interface screens 222 into any administrator-side wizard program module 212A through 212N supported on any operating system platform. Thus, a user is able to configure a common user interface screen 222 to contain or request certain data and is ensured that the common user interface screen will be insertable into an administrator-side wizard program module 212A through 212N or client-side wizard program module 214A through 214N, for example, or any other backup application and can be used on any platform. New common user interface screens 222 may be added to CPL 220 as needed to enhance the functionality of software application 200A.

Many of the functions required for the wizard application are included in the CPL 220 so that the user will be required to perform a minimal amount of programming. Furthermore, the wizard applications will have the same look and feel user interface on all operating system platforms whether the operating system is Solaris (e.g., 32 bit and 64 bit), AIX, HP, Windows (e.g., 2000, NT, XP, 2003), Unix, Linux, OpenVMS, Macintosh, Tru64 Unix 5.0A and 5.1, and the like. The present invention thus allows a developer who does not have extensive knowledge of different operating systems to apply a wizard application on various operating system platforms.

However, it will be appreciated that the administrator-side DLLs 216A through 216N and the client-side DLLs 218A through 218N can contain different user interface screens as part of the data which they contain and can load these user interface screens as needed. DLLs 216 and 218 can contain common user interface screens or different user interface screens specific to the particular backup operation they are going to perform. As such, CPL 220 is not necessarily required in order to perform backup operations.

Figure 3:
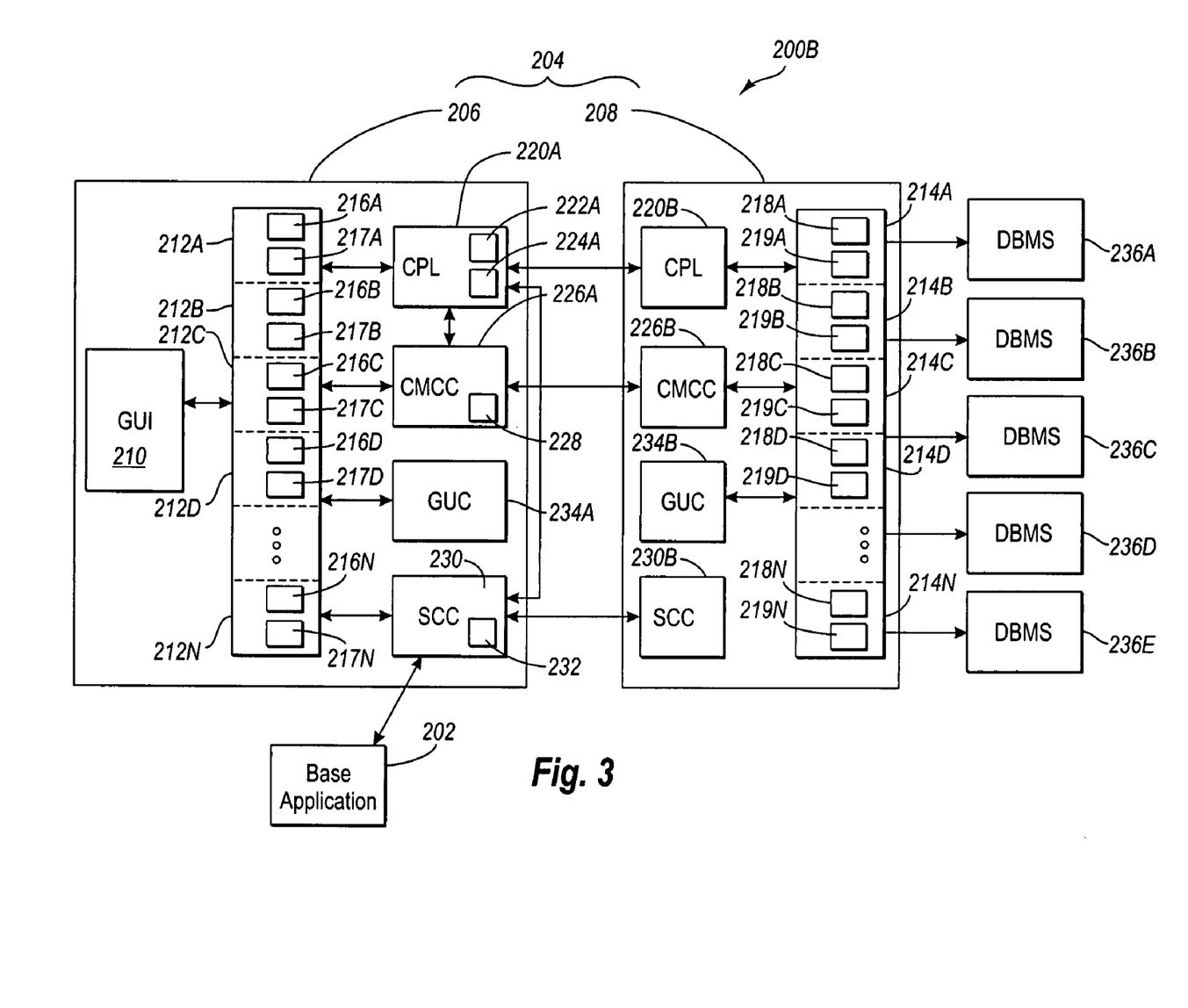
FIG. 3 illustrates another exemplary application for implementing embodiments of the present invention.

In one embodiment, shown in FIG. 2, CPL 220 can be located on the administrator-side 206. This can be advantageous in order to reduce the size of the footprint of client module 208, for example, if client module 208 is located on a client 106. In the embodiment where CPL 220 is located only on the administrator module 206, administrator-side DLLs 216A through 216N may communicate directly with client-side DLLs 218A through 218N. However, as shown in FIG. 3, CPL 220 can be bifurcated into an administrator-side CPL 220A and client-side CPL 220B. The administrator side CPL 220A and client-side CPL 220B communicate to provide common user interface screens on the administrator-side and any associated retrieval function required on the client-side.

FIG. 3 illustrates another embodiment of system 200B that illustrates that wizard configuration application 204 can include additional components. A client module communication component (CMCC) 226 (also bifurcated into an administrator-side CMCC 226A and client-side CMCC 226B) and a server communication component (SCC) 230 are illustrated. In one embodiment, administrator-side DLLs 216A through 216N can be responsible for initiating CPL 220, CMCC 226 and SCC 230.

CMCC 226 facilitates communication between the administrator module 206 and the client module 208, providing the framework for interaction between the administrator module 206 and client module 208. In one embodiment, CMCC 226 uses a single API 228 to establish communication between the administrator-side CMCC 226A and client-side 226B. Consequently, this establishes communication between administrator module 206 and client module 208. Communication between the administrator module 206 and client module 208 is based on the remote procedure (RPC) and Rapid Application Prototyping (RAP) calls. It will be appreciated that communication between administrator module 206 and client module 208 can occur by other means or through multiple APIs. Thus, CMCC 226 is not required in order to perform the present invention. More details regarding embodiments of CMCC 226 are disclosed in co-pending U.S. patent application Ser. No. 10/997,576, entitled "Software Configuration Methods and Client Module Communication Component," which has been filed on the same day as the present invention and is incorporated herein by reference.

The following example illustrates one embodiment of how the wizard configuration application 204 can operate. For example, suppose a user desires to backup Exchange Server data on a client 106. If the administrator module 206 is operating on Unix, the GUI 210 accesses the wizard program module 212C which is, for purposes of this example, configured to initiate the steps on the administrator-side for backing up Exchange Server data. The wizard program module 212C includes APIs 217C, one of which corresponds to a Unix operating system for allowing the GUI 210 to access DLLs 216C in wizard program module 212C.

DLLs 216C sequence and load various user interface screens onto GUI 210 in order for the user to provide the configuration data to specify a backup function for, in this example, Exchange Server data. In one embodiment, DLLs 216C uses common user interface screens 228 from CPL 220. In this example, where administrator module 206 is operating on a Unix platform, DLLs 216C access APIs 22 on CPL 220 corresponding to Unix.

Now, suppose client module 208 is running on a Windows operating system platform. CMCC 226A communicates with CMCC 226B to exchange information between the administrator module 206 and client module 208. CMCC 226B initiates wizard application module 214C which is configured, for purposes of this example, to initiate steps on the client side for backing up Exchange Server data. The CMCC 226B accesses APIs 219C corresponding to Windows platform to access the DLLs 218C in wizard program module 214C. The client-side DLL 218C corresponding to Exchange server gathers information from client 106 and pass the data to the administrator-side DLL 216C corresponding to Exchange server.

As shown in FIG. 3, wizard configuration application 204 can also include a SCC 230 on administrator module 206 in order to facilitate communication between the administrator module 206 and backup application 202. The administrator-side DLLs 216A through 216N have a static link to the SCC 230. The SCC 230 includes APIs 232 to communicate with server 102. As shown in FIG. 3, wizard configuration application 204 can also include a SCC 230 on administrator module 206 in order to facilitate communication between the administrator module 206 and backup application 202. The administrator-side DLLs 216A through 216N have a static link to the SCC 230. The SCC 230 includes APIs 232 to communicate with server 102. In one embodiment, a single API 232 is provided to communicate with server 102, similar to that for CMCC 220.

When GUI 210 is initiated, the administrator-side DLLs 216A through 216N initiates the SCC 230 to establish communication between the administrator module 206 and the backup application 202. The CPL 220A can also use the APIs 232 in the SCC 230 to communicate with backup application 202. Communication between the administrator module 206 and the backup application 202 in this manner allows the administrator module 206 to be aware of the servers 102 to which it is connected. In addition, the SCC 230 allows the administrator module 206 to detect the clients that are running on the network by having a client-side SCC 230B residing on client module 208.

As also shown in FIG. 3, wizard configuration application 204 includes a generic utility component (GUC) 234A located on the administrator module 206 which provides generic functions applicable to all administrator-side wizard program modules 212A through 212N. Such functions can include, but are not limited to, serializing outgoing RAP results stream to client 106 or de-serializing incoming RAP arguments from client 106. Client module 208 also includes a GUC 234B which provides generic functions applicable to all client-side wizard program modules 214A through 214N. Client-side DLLs 218A through 218N maintain a static link with client-side GUC 234B and thus can access the functions of the GUC 234B as needed. GUC 234B is the actual data collector which collects the information about the database data, file system data, or other particular data on client 106 to be backed up. Additional generic functions performed by client-side GUC 234B include, but are not limited to, writing or updating local client-side files with specified text input, encrypting text stream to be returned to the administrator module 206, deserializing incoming RAP arguments from the administrator computer 104, or serializing outgoing RAP results stream to administrator computer 104.

Finally, FIG. 3 illustrates that operation of the wizard configuration application 204 results in the data to be backed up being sent to a local or remote database (DB) or database management system (DBMS). Each client-side wizard program module 214A through 214N is configured to send the data to a DBMS 236A through 236N. It will be appreciated that DBMS 236A through 236N can be a backup storage 110 as shown in FIG. 1 or any other local or remote database management system.

3. Exemplary Method

Figure 4:
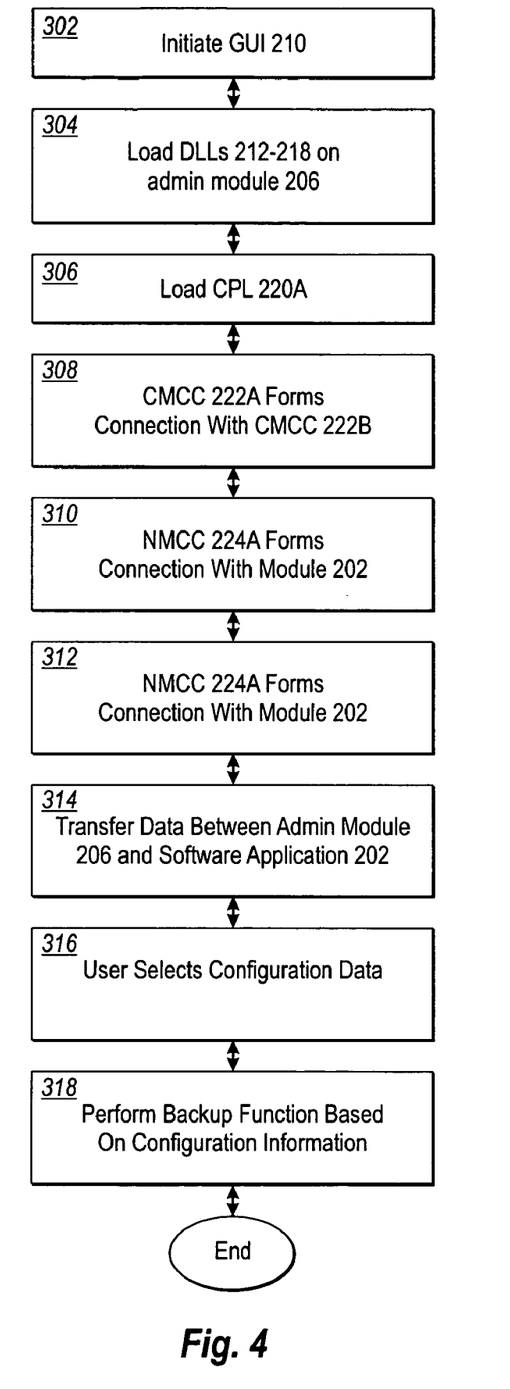
FIG. 4 illustrates an exemplary method for implementing embodiments of the present invention.

With reference to FIG. 4, an exemplary method for operating the software application 200A or 200B is as follows. During operation, when a user desires to perform a backup function using a wizard application, the user accesses the GUI 210 on, for example, a user machine 104. At step 302, GUI 210 is initiated. At step 304, after GUI 210 is initiated, the GUI 210 loads one or more administrator-side wizard program modules 212A through 212N which, in turn, load one or more corresponding DLLs 216A through 216N. The GUI 210 accesses APIs 217A through 217N corresponding to the operating system on which the administrator module 206 is operating in order to access DLLs 216A through 216N.

At step 306, the administrator-side DLLs 216A through 216N loads the administrator-side CPL 220A. In addition, at step 308, the administrator-side DLLs 216A through 216N loads administrator-side CMCC 226A, which then connects to client-side CMCC 226B. In one embodiment, administrator-side CMCC 226A causes an API 228 to connect to client-side CMCC 226B so that administrator module 206 can request information from client module 208. At step 310, administrator-side DLLs 216A through 216N also loads SCC 230, connecting administrator module 206 to backup application 202 on server 102. SCC 230 provides APIs 232 to communicate with backup application 202. It will be appreciated that the order of the connection between backup application 202, administrator module 206 and server module 208 may vary.

With backup application 202, administrator module 206 and client module 208 connected, steps 312 and 314 represent the exchange of information between administrator module 206 and client module 208 and between administrator module 206 and backup application 202, respectively. SCC 230 can be used to detect network server 102 and clients 106 that are running on the network.

At step 316, GUI 210 provides user interface screens for the user to select the configuration information. The user interface screens are generally loaded by DLLs 216A through 216N. The configuration information can include the network server to use, the client to be backed up, the type of data to be backed up on the client. As discussed above, selecting configuration information includes inserting information into user interface screens provided by a particular wizard program module which is configured for a particular wizard application. DLLs 216A through 216N sequence and load the user interface screens onto GUI 210. In one embodiment, this can include using common user interface screens provided by CPL 220A and loaded by administrator-side DLLs 216A through 216N. DLLs 216A through 216N access the API 222 of CPL 220 corresponding to the operating system on which the administrator module 206 is operating.

Selecting the network configuration can include initiating a server configuration wizard application and client configuration wizard application. Wizard program modules 212A and 214A and 212B and 214B can exemplarily be used to detect and select network configurations.

Configuration information for database configuration wizard applications and file system configuration wizard applications can include selecting a backup grouping or client resource. Selecting a backup grouping or client resource can exemplarily include the following steps. Wizards program modules 212C and 214C and 212D and 214D can exemplarily be used to detect and select modules or file systems to be backed up. Administrator-side DLLs 216C or 216D decodes the data from the client module 208 and loads a user interface screen to display the data on the GUI 210 for the user. The user interface screen can include the option of creating or updating a backup group or client resource selection. The user interface screen allows the user to search the files in the network server, form backup groupings or client resources, takes the user inputs, validates the user inputs, and passes the selected backup grouping or client resource name to administrator side DLLs 216A through 216N. Administrator-side DLLs 216A through 216N formats the data and then loads a user interface screen so that the user can view a summary of the configuration information it has selected. The user can indicate his/her final selection by selecting a "create" button. Once the user hits the "create" button, at step 326, the wizard configuration application 204 creates the backup grouping and/or client resource. After creating the backup grouping or client resource, the administrator-side DLLs 216A through 216N loads another user interface screen onto GUI 210 to allow a user to configure another backup group or client resource. In each of these steps, it will be appreciated that loading of a user interface screen onto the GUI 210 can include loading a common interface screen accessed from the CPL 220.

As mentioned above, wizard applications formed by wizard program modules 212 and 214 can contain DLLs 216 and 218 specific to the type of data that the user wants to back up. For example, if the user at step 314 decides to perform a backup of the Exchange server, administrator-side DLL 216C which is configured for Exchange server data is selected by GUI 210 to retrieve information from client 106. In this particular example, configuration information can include, but is not limited to, the operating system on which the client 106 is operating, the client version, the domain, the database list, the number of storage groups and Exchange servers, the name of the storage group, how many mail boxes there are, and the like. APIs 218A through 218N allow the wizard modules 214A through 214N to be compatible with wizard modules 212A through 212N even if the wizard modules are executed on different operating system platforms.

At step 318, the backup application 202 performs the backup function based on the designated configuration information. The process can then repeat again for a different backup process.

It will be appreciated that the above steps can take place in a different order or that different steps can be added or eliminated. In another embodiment, after loading GUI 210, the GUI 210 could load CPL 220A. The CPL 220A can then be used to initiate the administrator-side DLLs 216A through 216N. Either CPL 220A or DLLs 216A through 216N could then be used to initiate CMCC 222A. After CMCC 222B is initiated, CMCC 222B could then initiate GUC 234B which would then be used to initiate client-side DLLs 218A through 218N.

In embodiments where CMCC 222 is not present, administrator-side DLLs 216A through 216N could initiate client-side DLLs 218A through 218N. Similarly, where CMCC 222 is not present, CPL 220A could initiate DLLs 218A through 218N. Other configurations are also possible.

The present invention thus allows a user to perform all of the tasks required to configure a backup using wizard configuration application 204. The present invention allows a user to efficiently configure devices, clients, and create backup groupings and client resources. The present invention also provides efficiency by having a common look and feel across all operating system platforms. The present invention further ensures that various common user interface screens can be inserted in various modules regardless of operating system platform.

The present invention can provide efficiency in a number of situations in which a user implements the backup application 202. For example, an administrator working on a large network can efficiently configure a number of clients for backup operations, regardless of differences in operating system platforms. In one embodiment, the administrator can remotely configure the devices, clients and backup groupings. Advantageously, the administrator can include additional wizard applications as needed because of the modular architecture of the wizard configuration application 204.

Additionally, the administrator can load the wizard configuration application 204 onto any client computer (including the client to be backed up) and configure one or more clients for backup operations.

Advantages of the present invention can also be recognized, for example, in a customer service environment where a customer service representative is explaining to a client user how to configure a backup operation. The customer service representative can perform a very quick demonstration on how to configure the device, the client, the backup grouping, or the client resource. In situations where the client user can vary from situation to situation and where the client user may be operating on different platforms, it will be appreciated that the present invention enhances efficiency of even this aspect of using the backup application 202.

The present invention extends to both methods and systems for backing up data. The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes one or more clients in communication with a server that stores a backup of data stored on the one or more clients, a method for preparing the system to back up data of a client, the method comprising:

operating a graphical user interface at a first device for displaying to a user information about the data of the client;

at an administrator module configured to execute in the first device, initiating first wizard program modules comprising dynamic link libraries configured to carry a user through the steps to complete a backup function, each of the first wizard program modules comprising one or more application programming interfaces which allow the first wizard program modules to communicate with a first operating system on which the administrator module is operating, wherein the steps to complete a backup function include selection of a network configuration and a type of data to be backed up, the network configuration including the first device having the first operating system and a second device having a second operating system;

at a client module configured to execute in one or more of the clients, initiating second wizard program modules comprising dynamic link libraries configured to retrieve information about the data of a client, each of the second wizard program modules comprising one or more application programming interfaces which allow the second wizard program modules to communicate with the second operating system on which the client module is operating; and loading one or more common user interface screens of a common presentation layer onto the graphical user interface, wherein the one or more common user interface screens have a similar look and feel whether the first and second operating system are different, wherein the one or more common user interface screens have a similar look and feel whether the administrator module operates on the first device having the first operating system or on the second device having the second operating system;

wherein the common presentation layer includes one or more application programming interface screens which allow the first and second wizard program modules to access the one or more common user interface screens.

2. The method as recited in claim 1, wherein the first and second wizard program modules each comprise at least one of a device configuration wizard application, a client configuration wizard application, a database configuration wizard application, and a file system configuration wizard application.

3. The method as recited in claim 1, wherein the dynamic link libraries on the administrator module load the one or more common user interface screens onto the graphical user interface.

4. The method as recited in claim 1, further comprising, at the administrator module, initiating a server communication component configured to establish communication between the graphical user interface and a server.

5. The method as recited in claim 4, wherein the server communication component comprises one or more application programming interfaces which allow the server to communicate with the server communication component.

6. In a system that includes one or more clients in communication with a server that stores a backup copy of data stored on the one or more clients, a method for preparing the system to back up data of a client, the method comprising:

operating a graphical user interface at a first device for displaying to a user information about the data of the client;

at an administrator module configured to execute in the first device, initiating first wizard program modules comprising dynamic link libraries configured to carry a user through the steps to complete a backup function, each of the first wizard program module comprising one or more application programming interfaces which allow the first wizard program modules to communicate with a first operating system on which the administrator module is operating, wherein the steps to complete a backup function include selection of a network configuration and a type of data to be backed up, wherein the network configuration includes the first device having the first operating system and a second device having a second operating system;

at a client module configured to execute in one or more of the clients, initiating second wizard program modules comprising dynamic link libraries configured to retrieve information about the data of a client, each of the second wizard program modules comprising one or more application programming interfaces which allow the second wizard program modules to communicate with the second operating system on which the client module is operating;

at the administrator module, initiating a common presentation layer comprising:

a plurality of common user interface screens that can be inserted into any wizard program module on the administrator module or the client module, wherein the plurality of common user interface screens have a similar look and feel at both the administrator module and the client module whether the first and second operating system are different, wherein the plurality of common user interface screens have a similar look and feel whether the administrator module operates on the first device having the first operating system or on the second device having the second operating system; and one or more application programming interface screens which allow the first and second wizard program modules to access the plurality of common user interface screens.

7. The method as recited in claim 6, further comprising at the administrator module allowing a user to specify one or more servers to store backup information and one or more clients having data to be backed up.

8. The method as recited in claim 6, further comprising at the administrator module allowing a user to specify the type of data to be backed up.

9. The method as recited in claim 6, wherein the administrator module and client module are located on a same device.

10. The method as recited in claim 6, wherein the administrator module is located at the server.

11. A system for backing up data on a client computer, the system comprising:

a server and one or more client computers;

an administrator module configured to execute in a first device included in the server and the one or more client computers, the administrator module comprising:

a graphical user interface operating at the first device; and first wizard program modules comprising dynamic link libraries configured to carry a user through the steps to complete a backup function, each of the first wizard program modules comprising one or more application programming interfaces to allow the first wizard program modules to communicate with a first operating system on which the administrator module is operating, wherein the steps to complete a backup function include selection of a network configuration and a type of data to be backed up, wherein the network configuration includes a first device having a first operating system and a second device having a second operating system; and a client module configured to execute in one or more of the clients, the client module comprising:

second wizard program modules comprising dynamic link libraries configured to retrieve information about the data of a client, each of the second wizard program modules comprising one or more application programming interfaces to allow the second wizard program modules to communicate with the second operating system on which the client module is operating, the administrator module and the client module being configured to exchange information between the first wizard program modules of the administrator module and the second wizard program modules of the client module; and a presentation layer comprising:

a plurality of common user interface screens that have a similar look and feel at both the administrator module and the client module whether the first and second operating system are different, wherein the plurality of common user interface screens have a similar look and feel when the administrator module operates on the first device having the first operating system as when the administrator module operates on the second device having the second operating system; and one or more application programming interfaces which allow the common user interface screens to be inserted into any of the first or second wizard program modules.

12. The system of claim 11, further comprising, at the administrator module, a server communication component configured to allow the administrator module communicate with a base software application.

13. The system of claim 11, wherein the administrator module is located on a device remote from the server.

14. The system of claim 11, wherein the client module is located on a client computer remote from the server.

15. The system of claim 11, wherein the administrator module is located on the server.

16. The system of claim 11, wherein the administrator module and the client module are located on a same device.

17. A method comprising:

executing a graphical user interface of a wizard configuration application to display one or more common user interface screens that are retrieved from a common presentation layer at a first device having a first operating system, the one or more common user interface screens allowing a user to select a network configuration and to select a type of data to be backed up, wherein the network configuration includes at least the first device having the first operating system and a second device having in a second operating system;

initiating first wizard program modules comprising dynamic link libraries configured to carry the user through steps to select the network configuration;

initiating second wizard program modules comprising dynamic link libraries configured to carry the user through steps to select the type of data to be backed up;

providing, at the common presentation layer, a plurality of application programming interfaces configured to allow a main driver to access the common user interface screens, the main driver comprising a plurality of wizard program modules;

loading the plurality of wizard program modules;

sequencing the one or more common user interface screens using the main driver linked to the common presentation layer; and providing a common look and feel for each of the one or more common user interface screens at both the first device having the operating system and at the second device having the second operating system whether the first and second operating system are different, wherein the one or more common user interface screens have a common look and feel when the wizard configuration application executes at the first device having the first operating system as when the wizard configuration application executes at the second device having the second operating system.

18. The method as recited in claim 17, further comprising, at the main driver, providing a plurality of application programming interfaces configured to allow the graphical user interface to access the main driver.

19. The method as recited in claim 17, further comprising uploading a new wizard program module when a new wizard program module is needed.

20. The method as recited in claim 17, further comprising, after a user has selected a network configuration, including selecting one or more clients, and selected and configured the type of data to be backed up, performing a backup process on the selected client.

* * * * *